(12) United States Patent
Caglayan et al.

(10) Patent No.: US 10,552,822 B2
(45) Date of Patent: Feb. 4, 2020

(54) SYSTEM AND METHOD FOR PROCESSING FINANCIAL TRANSACTIONS USING A MOBILE DEVICE FOR PAYMENT

(71) Applicant: MasterCard International Incorporated, Purchase, NY (US)

(72) Inventors: Yigit Caglayan, Istanbul (TR); Kemal Uyan, Istanbul (TR)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 436 days.

(21) Appl. No.: 14/483,254

(22) Filed: Sep. 11, 2014

(65) Prior Publication Data
US 2014/0379582 A1 Dec. 25, 2014

Related U.S. Application Data

(63) Continuation of application No. 13/833,625, filed on Mar. 15, 2013.

(51) Int. Cl.
*G06Q 20/32* (2012.01)
*G06Q 20/36* (2012.01)
(Continued)

(52) U.S. Cl.
CPC ......... *G06Q 20/3226* (2013.01); *G06Q 20/10* (2013.01); *G06Q 20/36* (2013.01); *G06Q 20/363* (2013.01); *G06Q 20/4012* (2013.01)

(58) Field of Classification Search
CPC .................. G06Q 20/3223; G06Q 20/3255
(Continued)

(56) References Cited

U.S. PATENT DOCUMENTS 8,543,497 B1  9/2013 Mohsenzadech
2002/0181710 A1  12/2002 Adam et al.
(Continued)

FOREIGN PATENT DOCUMENTS

KR     102010123895 A    11/2010
KR      101092657 B1    12/2011
WO    WO 2006/095250    *  9/2006  ............. G06Q 20/00

OTHER PUBLICATIONS

Turkish Office Action dated Dec. 17, 2015 by the Turkish Patent Institute in corresponding Turkish Patent Application No. 2013/07389 (6 pages).
(Continued)

*Primary Examiner* — Hai Tran
(74) *Attorney, Agent, or Firm* — Buchanan Ingersoll & Rooney PC

(57) ABSTRACT

A method for processing a financial transaction includes: storing, in a database, a plurality of wallet data entries, wherein each wallet data entry includes at least a mobile device identifier and payment details associated with at least one payment account; receiving, by a receiving device, an authorization request for a financial transaction, wherein the authorization request includes at least a mobile device identifier and transaction data; transmitting, to a mobile computing device associated with the mobile device identifier, at least the transaction data; receiving, from the mobile computing device, an indication of a payment account for funding of the financial transaction; identifying, in the database, payment details associated with the indicated payment account in a wallet data entry including the mobile device identifier included in the authorization request; and transmitting, to an issuer associated with the indicated payment account, at least the payment details and the transaction data.

14 Claims, 11 Drawing Sheets

(51) Int. Cl.
*G06Q 20/10* (2012.01)
*G06Q 20/40* (2012.01)

(58) Field of Classification Search
USPC .......................................................... 705/65
See application file for complete search history.

(56) References Cited

U.S. PATENT DOCUMENTS

| | | |
|---|---|---|
| 2008/0208742 A1 | 8/2008 | Arthur et al. |
| 2011/0143710 A1 | 6/2011 | Hirson et al. |
| 2011/0231258 A1 | 9/2011 | Winters |
| 2012/0143768 A1* | 6/2012 | Hammad ............... G06Q 20/12 705/67 |

OTHER PUBLICATIONS

International Search Report and Written Opinion issued by the International Searching Authority dated Dec. 22, 2015 in corresponding PCT Application No. PCT/US2015/049353 (14 pages).
Notice of Allowance dated Jun. 23, 2019, by the U.S Patent and Trademark Office in corresponding U.S. Appl. No. 13/833,625. (10 pages).

* cited by examiner

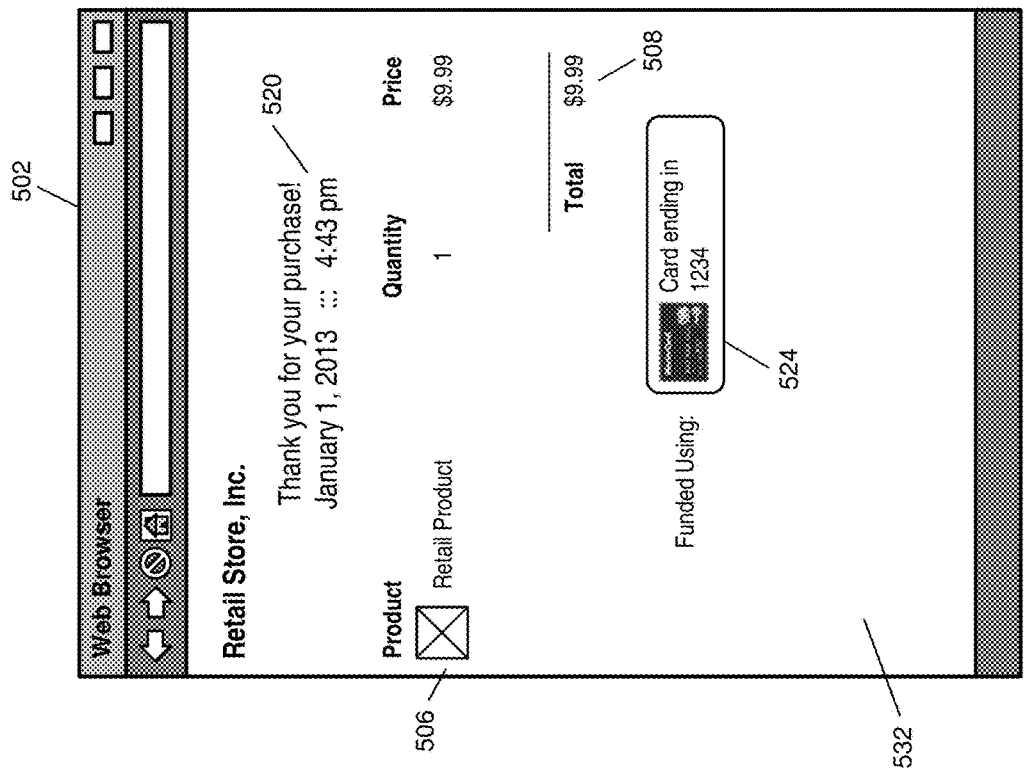
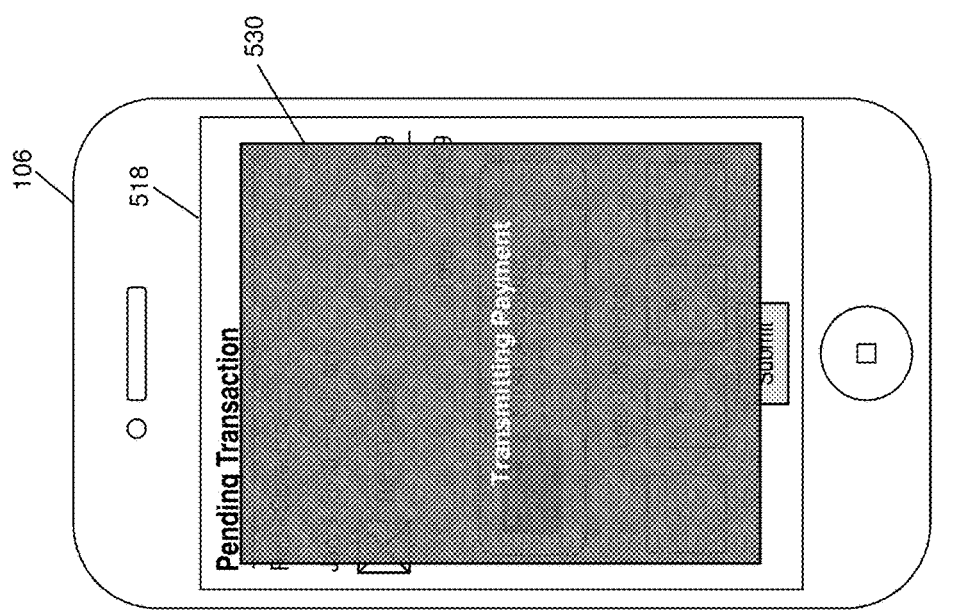
FIG. 5F
FIG. 5E

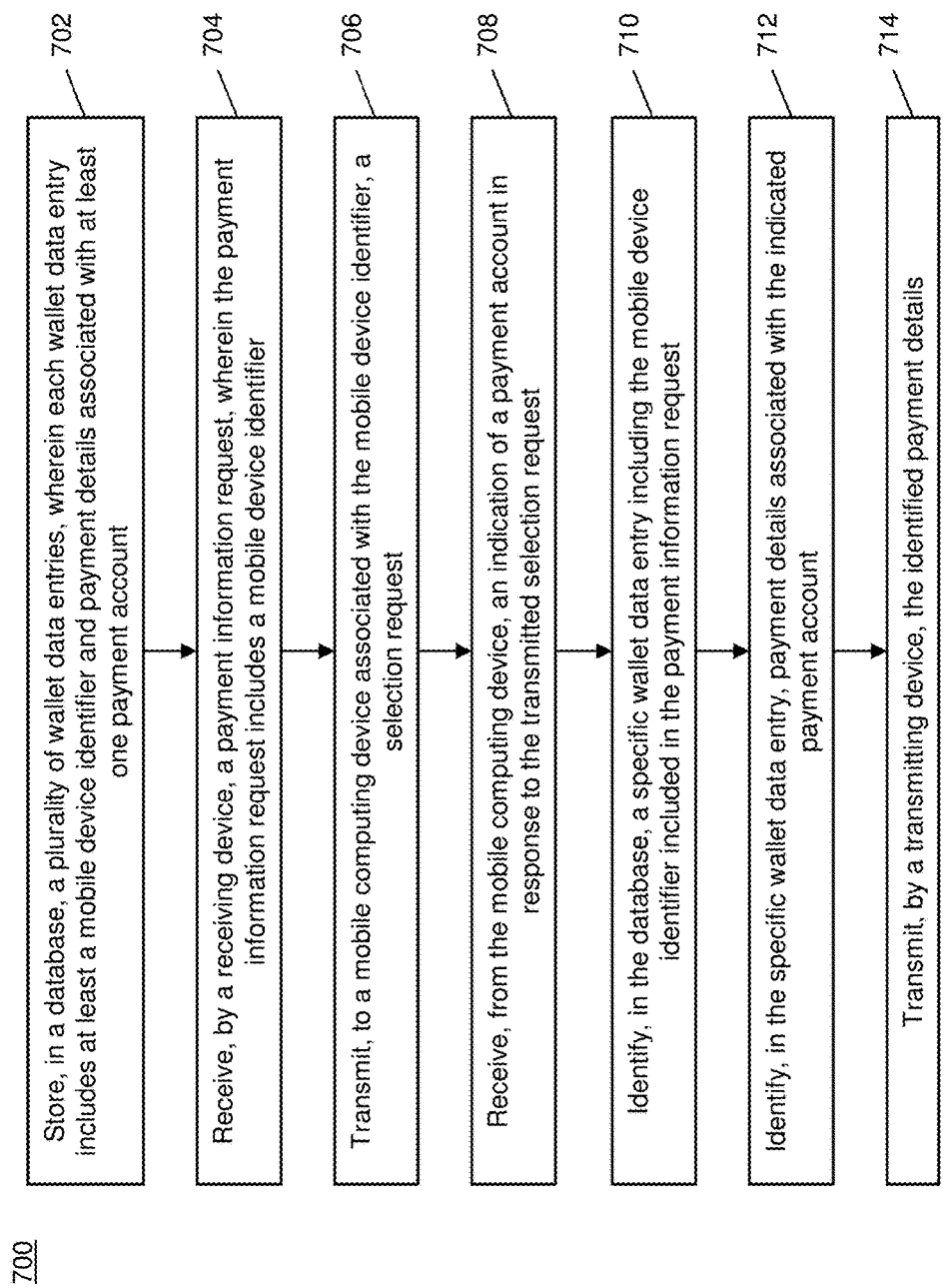

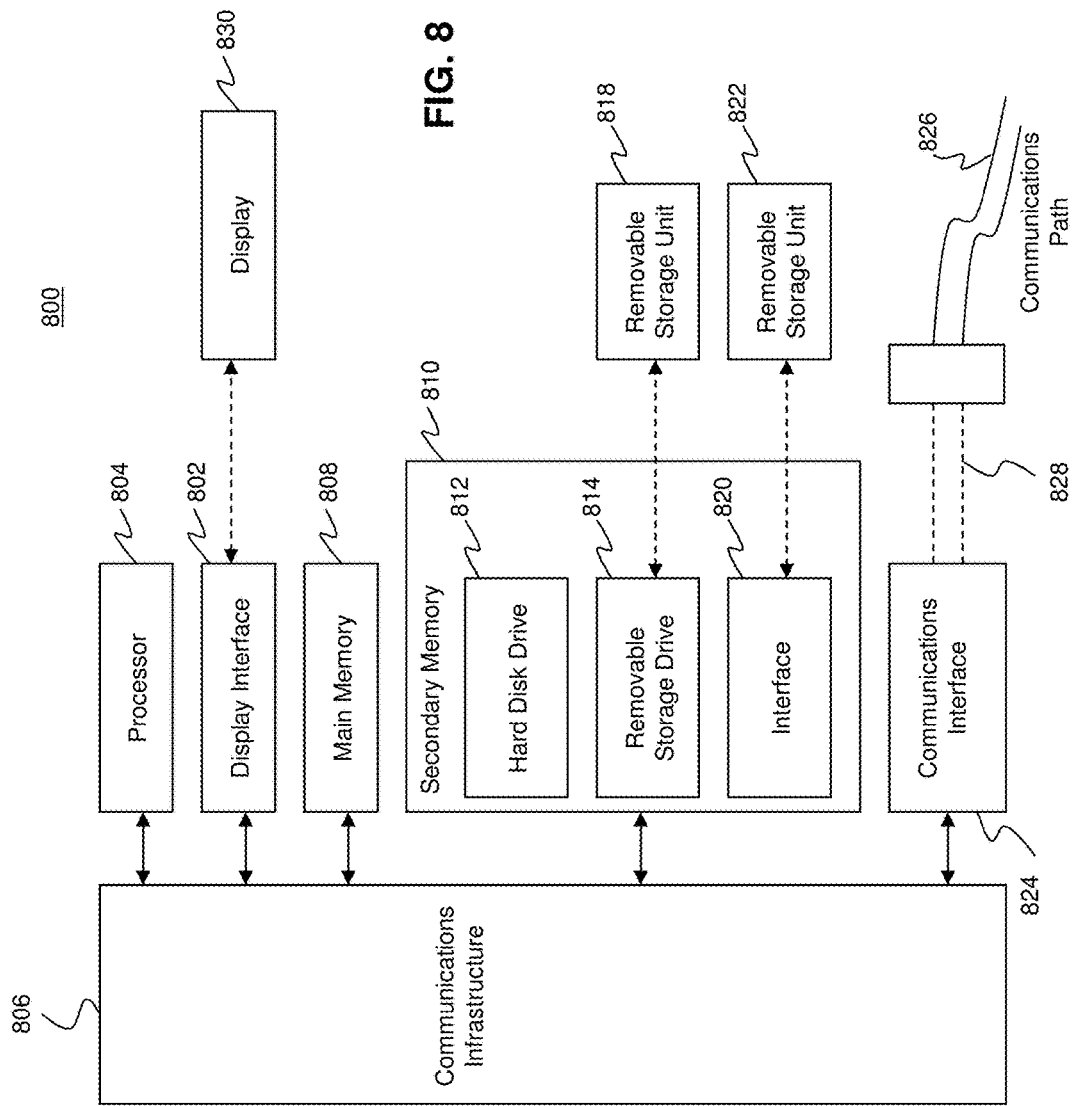

SYSTEM AND METHOD FOR PROCESSING FINANCIAL TRANSACTIONS USING A MOBILE DEVICE FOR PAYMENT

FIELD

The present disclosure relates to the conducting of financial transactions using a mobile device, specifically the selection of a payment account for funding a financial transaction using a mobile device for Internet and point-of-sale transactions.

BACKGROUND

The use of mobile devices to conduct payment transactions via near field communication has been beneficial for both consumers and merchants. Consumers may be able to conduct financial transactions using their mobile device without the need to carry a physical payment card, which may result in higher account security. However, some mobile devices may not be configured to securely store payment credentials, which may make them unable to be used to conduct financial transactions. Furthermore, many consumers may be apprehensive to use their mobile devices for fear of their payment account information being intercepted via the near field communication process.

Thus, there is a need for a technical solution to providing a platform for consumers to use a mobile device to conduct financial transactions, without the need for payment credentials to be stored locally on the mobile device or transmitted to or from the mobile device. Such a solution may enable a consumer to engage in financial transactions both on the Internet and at a point-of-sale, without the need for the consumer to exchange or possess account information. This may result in additional security and peace of mind for the consumer, which may result in increased business activity for merchants.

SUMMARY

The present disclosure provides a description of systems and methods for the processing of financial transactions and identification of payment details.

A method for processing a financial transaction includes: storing, in a database, a plurality of wallet data entries, wherein each wallet data entry includes at least a mobile device identifier and payment details associated with at least one payment account; receiving, by a receiving device, an authorization request for a financial transaction, wherein the authorization request includes at least a mobile device identifier and transaction data; transmitting, to a mobile computing device associated with the mobile device identifier, at least the transaction data; receiving, from the mobile computing device, an indication of a payment account for funding of the financial transaction; identifying, in the database, payment details associated with the indicated payment account in a wallet data entry including the mobile device identifier included in the authorization request; and transmitting, to an issuer associated with the indicated payment account, at least the payment details and the transaction data.

A method for identifying payment details includes: storing, in a database, a plurality of wallet data entries, wherein each wallet data entry includes at least a mobile device identifier and payment details associated with at least one payment account; receiving, by a receiving device, a payment information request, wherein the payment information request includes a mobile device identifier; transmitting, to a mobile computing device associated with the mobile device identifier, a selection request; receiving, from the mobile computing device, an indication of a payment account in response to the transmitting selection request; identifying, in the database, a specific wallet data entry including the mobile device identifier included in the payment information request; identifying, in the specific wallet data entry, payment details associated with the indicated payment account; and transmitting, by a transmitting device, the identified payment details.

A system for processing a financial transaction includes a processing device, a database, a receiving device, and a transmitting device. The database is configured to store a plurality of wallet data entries, wherein each wallet data entry includes at least a mobile device identifier and payment details associated with at least one payment account. The receiving device is configured to receive an authorization request for a financial transaction, wherein the authorization request includes at least a mobile device identifier and transaction data. The transmitting device is configured to transmit, to a mobile computing device associated with the mobile device identifier, at least the transaction data. The receiving device is further configured to receive, from the mobile computing device, an indication of a payment account for funding of the financial transaction. The processing device is configured to identify, in the database, payment details associated with the indicated payment account in a wallet data entry including the mobile device identifier included in the authorization request. The transmitting device is further configured to transmit, to an issuer associated with the indicated payment account, at least the payment details and the transaction data.

A system for identifying payment details includes a processing device, a database, a receiving device, and a transmitting device. The database is configured to store a plurality of wallet data entries, wherein each wallet data entry includes at least a mobile device identifier and payment details associated with at least one payment account. The receiving device is configured to receive a payment information request, wherein the payment information request includes a mobile device identifier. The transmitting device is configured to transmit, to a mobile computing device associated with the mobile device identifier, a selection request. The receiving device is further configured to receive, from the mobile computing device, an indication of a payment account in response to the transmitting selection request. The processing device is configured to identify, in the database, a specific wallet data entry including the mobile device identifier included in the payment information request, and identify, in the specific wallet data entry, payment details associated with the indicated payment account. The transmitting device is further configured to transmit the identified payment details.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 5A-5F are illustrations of a graphical user interface for conducting an Internet financial transaction using the mobile device of FIG. 1 in accordance with exemplary embodiments.

FIG. 7 is a flow chart illustrating an exemplary method for identifying payment details in accordance with exemplary embodiments.

FIG. 8 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable. Payment cards may also include real card accounts having associated real card account numbers (RCAs) and mobile cloud accounts having associated mobile cloud account numbers (MCAs) as discussed in more detail herein.

System for Processing Financial Transactions Conducting with a Mobile Device

Figure 1:
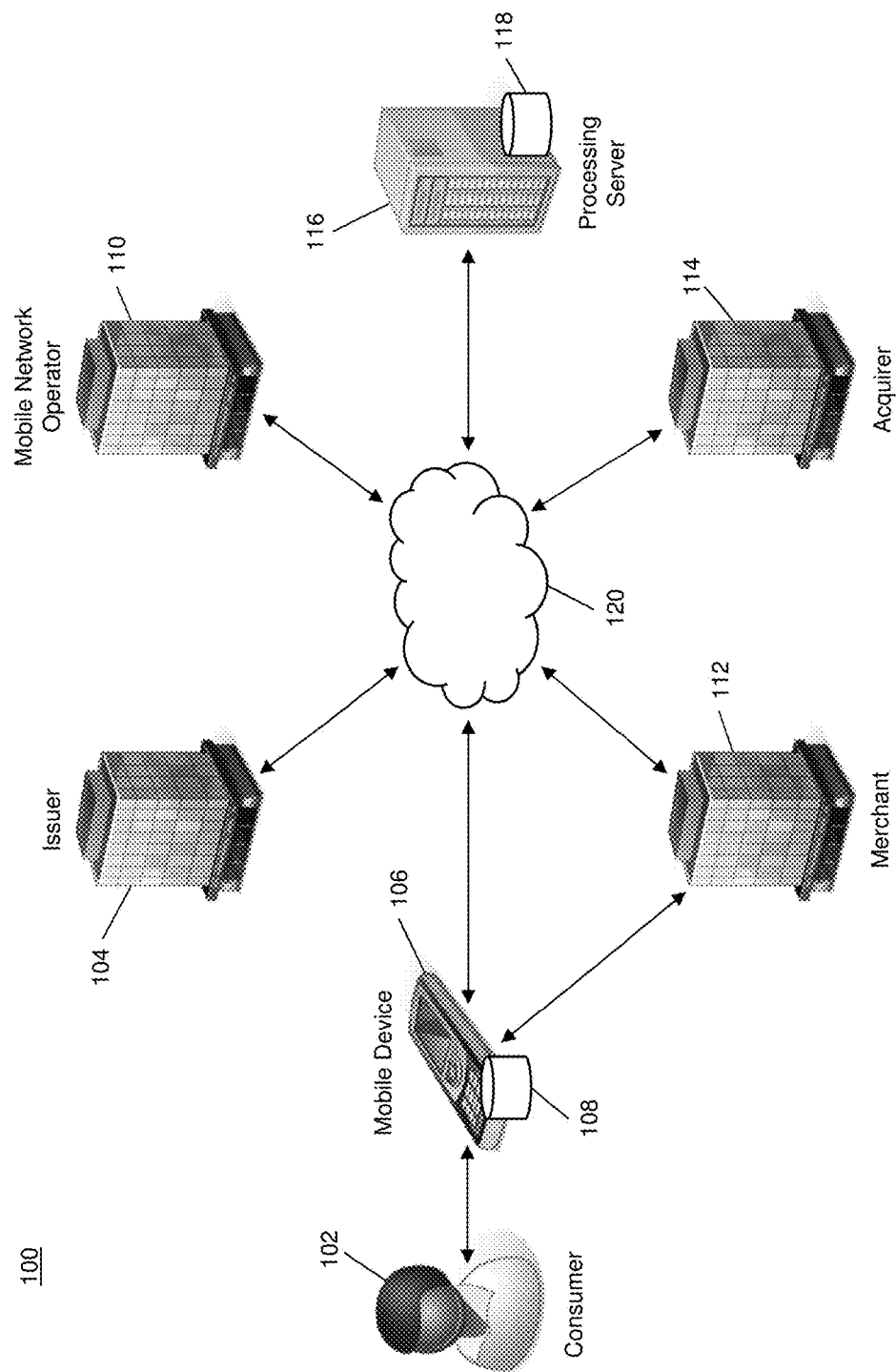
FIG. 1 is a high level architecture illustrating a system for the processing of financial transactions and transmitting of payment details based on indications received from a mobile device in accordance with exemplary embodiments.

FIG. 1 illustrates a system 100 for processing financial transactions conducted with a mobile device and the identification of payment details as indicated by a mobile device.

A consumer 102 may have one or more payment accounts (e.g., payment card accounts) issued by an issuer 104, such as an issuing bank. It is noted that as used herein a consumer 102 does not have to consume or purchase products or services, but rather be anyone or any entity desiring to transfer money to another person or entity. The consumer 102 may have a mobile device 106. The mobile device 106 may be any type of mobile computing device suitable for performing the functions as disclosed herein, such as a cellular phone, smart phone, NFC-enabled phone, tablet computer, etc. Suitable configurations of the mobile device 106 will be apparent to persons having skill in the relevant art, such as the computer system 800 illustrated in FIG. 8 and discussed in more detail below.

The mobile device 106 may include payment selection data 108. The payment selection data 108 may include data suitable for the selection of a payment account associated with the consumer 102 for use in funding a financial transaction. In an exemplary embodiment, the payment selection data 108 may not include any personally identifiable information or information that may compromise the associated payment accounts, such as payment account numbers. For example, the payment selection data 108 may include the last four digits of the associated payment account number and a nickname associated with the payment account.

The consumer 102 may initiate a financial transaction with a merchant 112 for the purchase of products (e.g., goods and/or services). It should be noted that as used herein the merchant 112 can be a person in a person-to-person (P2P) payment transaction, a pre-paid card provider (thereby enabling a top-up or increases in the remaining value on the pre-paid card), a utility to enable utility payments, data and voice service provider enabling purchase of additional air time or increasing a data plan, etc., and virtually any other entity that wishes to receive payments with the involvement of a mobile device 106 of a consumer 102. In some embodiments, the consumer 102 may initiate an in-person financial transaction, such as conducted at a physical location of the merchant 112 via a point-of-sale terminal. In other embodiments, the consumer 102 may initiate the financial transaction via a network 120, such as the Internet. In some instances, the Internet transaction may be conducted with the mobile device 106 via a mobile network operator 110 (e.g., a wireless service provider). In other instances, the Internet transaction may be conducted with a separate device, such as a computing device (e.g., desktop computer, laptop computer, notebook computer, etc.).

The merchant 112 may enter transaction details into a transaction system (e.g., via the point-of-sale terminal or through an Internet webpage). The merchant 112 may then prompt the consumer 102 to provide payment details for funding of the financial transaction. In one embodiment, the mobile device identifier may be a phone number associated with the mobile device 106. In another embodiment, the mobile device identifier may be a media access control (MAC) address associated with the mobile device 106.

The consumer 102 may provide the mobile device identifier via the merchant website in an Internet transaction. In a point-of-sale transaction, the consumer 102 may provide the mobile device identifier via the point-of-sale terminal, such as by entering of the mobile device identifier on a physical or touch-enabled keypad (which of course the merchant 112 can do for the consumer 102) or via transmission of the mobile device identifier from the mobile device 106 to the point-of-sale terminal via near field communication (NFC), or nearly any other form of inputting or transferring data. In certain instances, the point-of-sale terminal might be another mobile device of the merchant 112, particularly in instances when the merchant 112 is an individual involved in a P2P transaction. Methods and systems suitable for the transmission of information via NFC will be apparent to persons having skill in the relevant art.

The merchant 112 may receive the mobile device identifier and may forward the mobile device identifier and any relevant transaction data to an acquirer 114, such as an acquiring bank. The acquirer 114 may submit an authorization request to a processing server 116 including the transaction data and mobile device identifier. The submitting of authorization requests for financial transactions will be apparent to persons having skill in the relevant art.

The processing server 116 may include a consumer database 118, which may store a plurality of wallet data entries. Each wallet data entry may include a mobile device identifier associated with a mobile device and payment details associated with at least one payment account, although the actual or complete card details may be only stored on the processing server 116 so that they optionally do not have to be stored on the mobile device 106. Alternatively, the card details can be stored on both the mobile device 106 and the processing server 116, or just on the mobile device 106 and transmitted from the mobile device 106 through the processing server 116. The processing server 116 may identify a wallet data entry in the consumer database 118 including the mobile device identifier included in the authorization request (e.g., associated with the mobile device 106). The processing server 116 may then transmit a selection request to the mobile device 106 over the network 120 (e.g., via the mobile network operator 110). In some embodiments, the selection request may include a portion of the transaction data, such as for the consumer 102 to use to identify the financial transaction.

The mobile device 106 may display the received selection request to the consumer 102 along with a prompt for the consumer 102 to select a payment account to be used to fund the financial transaction. The consumer 102 may select a payment account, and the mobile device 106 may submit identifying information included in the payment selection data 108 to the processing server 116 in response to the selection request. In some embodiments, the consumer 102 may have previously indicated a payment account to be used in payment transactions involving the merchant 112. In such an embodiment, the mobile device 106 may receive a confirmation request, which may be displayed to the consumer 102. The confirmation request may include transaction data for the payment transaction, such as a transaction amount. The consumer 102 may confirm the transaction, and the mobile device 106 may submit the confirmation to the processing server 116. In this embodiment, the card details do not have to be stored or displayed on the mobile device 106, and the confirmation can be as simple as a virtual button that might or might not indicate a particular prestored card selection.

The processing server 116 may receive the indication of the payment account to be used to fund the financial transaction and may then identify payment details associated with the selected payment account in the wallet data entry associated with the mobile device 106. The processing server 116 may then submit the authorization request to a payment network with the identified payment details included for use in funding the financial transaction. In instances where the processing server 116 receives confirmation from the consumer 102 via the mobile device 106, the processing server 116 may submit the authorization request using previously stored payment account details. In some embodiments, the processing server 116 may process the financial transaction. Methods and systems suitable for processing financial transactions will be apparent to persons having skill in the relevant art. For example, the processing server 116 may forward the authorization request to the issuer 104, which may identify the payment account and return an authorization response indicating approval or denial of the financial transaction.

The processing server 116 may receive an authorization response from the issuer 104 or the payment network and may forward the authorization response to the acquirer 114 and/or the merchant 112. In some embodiments, the processing server 116 may transmit a notification to the mobile device 106 indicating approval or denial of the financial transaction. The merchant 112 may finalize the financial transaction, such as by providing a receipt to the consumer 102 and/or providing the transacted for products to the consumer 102.

Processing Device

Figure 2:
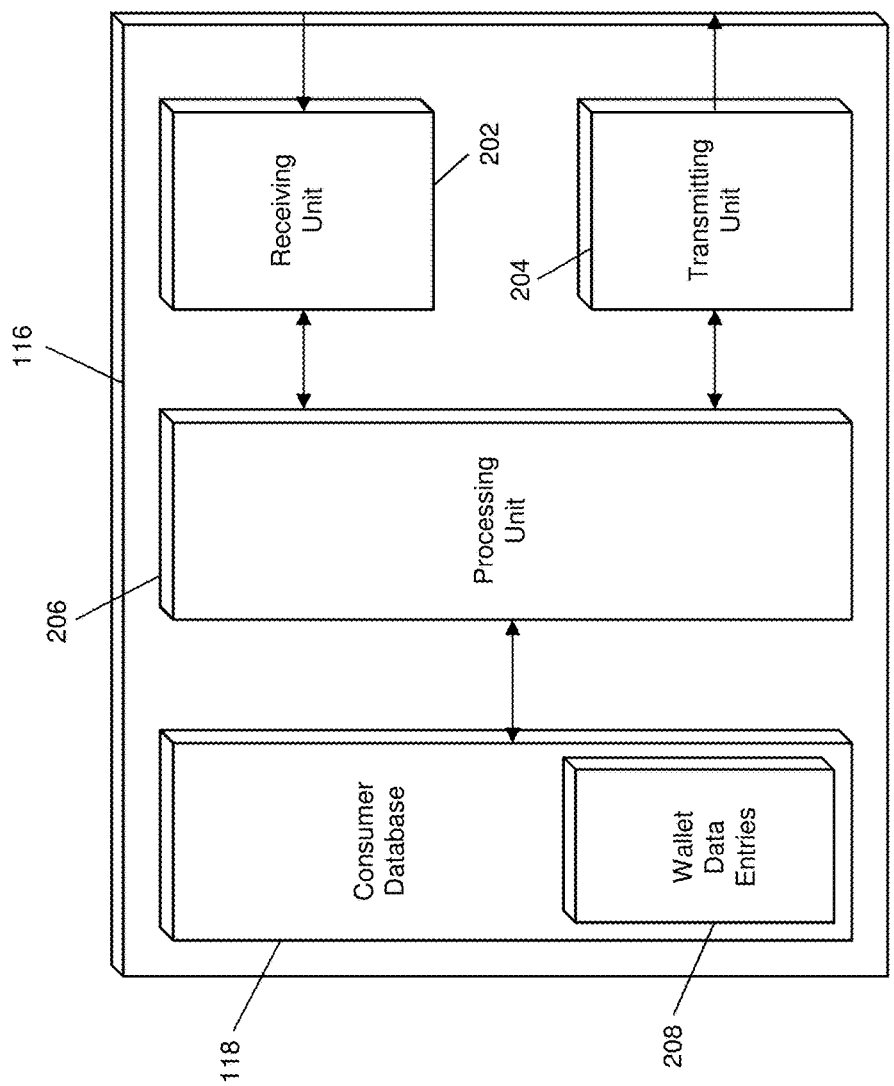
FIG. 2 is a block diagram illustrating the processing server of FIG. 1 for the processing of financial transactions in accordance with exemplary embodiments.

FIG. 2 illustrates an embodiment of the processing server 116 of the system 100. It will be apparent to persons having skill in the relevant art that the embodiment of the processing server 116 illustrated in FIG. 2 is provided as illustration only and may not be exhaustive to all possible configurations of the processing server 116 suitable for performing the functions as discussed herein. For example, the computer system 800 illustrated in FIG. 8 and discussed in more detail below may be a suitable configuration of the processing server 116.

The processing server 116 may include a receiving unit 202. The receiving unit 202 may be configured to receive an authorization request for a financial transaction. The authorization request may include at least a mobile device identifier, and any other information as will be apparent to persons having skill in the relevant art. The processing server 116 may also include a transmitting unit 204. The transmitting unit 204 may be configured to transmit, to a mobile device associated with the received mobile device identifier (e.g., the mobile device 106) a portion of the transaction data, such as information suitable to enable the consumer 102 to identify the financial transaction as genuine, or for confirmation of the amount of the transaction.

The receiving unit 202 may receive an indication of a payment account to fund the financial transaction from the mobile device 106. The processing server 116 may also include a processing unit 206, which may identify a wallet data entry 208 in the consumer database 118 that includes the mobile device identifier. The wallet data entry 208 may also include payment details associated with at least one payment account. The processing unit 206 may identify the payment account indicated by the consumer 102 and may identify the associated payment details. The transmitting unit 204 may then transmit an authorization request including the identified payment details to the issuer 104 and/or a payment network.

In embodiments where the consumer 102 may confirm a transaction and may not be required to select a payment account, such as embodiments where a payment account may be previously identified and/or associated with a particular merchant 112, each wallet data entry 208 may also include a merchant identifier for one or more merchants 112, or an indication of a default payment account to be used in payment transactions. In such an embodiment, the processing unit 206 may be configured to identify the default payment account in the wallet data entry 208, whose payment details may be transmitted by the transmitting unit 204 accordingly.

In instances where the processing server 116 may operate as a payment network, the receiving unit 202 may be further configured to receive an authorization response from the issuer 104. The transmitting unit 204 may then forward the authorization response to the merchant 112 and/or the acquirer 114. In some embodiments, the transmitting unit 204 may also transmit a notification to the mobile device 106 indicating approval or denial of the financial transaction.

In one embodiment, the payment details associated with each payment account in each of the wallet data entries 208 may further include a mobile personal identification number (PIN). The mobile PIN may be a number or value associated with the payment account used for authentication as will be apparent to persons having skill in the relevant art. In such an embodiment, the indication of a selected payment account received by the receiving unit 202 may further include a provided PIN as entered by the consumer 102 upon selection of the payment account. The processing unit 206 may validate the provided PIN using methods apparent to persons having skill in the relevant art.

If the provided PIN is invalid (e.g., does not correspond to the mobile PIN associated with the payment account or otherwise fails validation), the processing unit 206 may respond to the authorization request by submitting an authorization response indicating denial of the financial transaction. In such an instance, the transaction may be denied without proceeding to the issuer 104. In some instances, the processing server 116 may transmit a notification to the issuer 104 of the failed validation of the PIN for the financial transaction. If, on the other hand, the provided PIN is valid, the processing server 116 may continue with the processing of the financial transaction using methods and systems as will be apparent to persons having skill in the relevant art.

Transaction Processing Flow

Figure 3A:
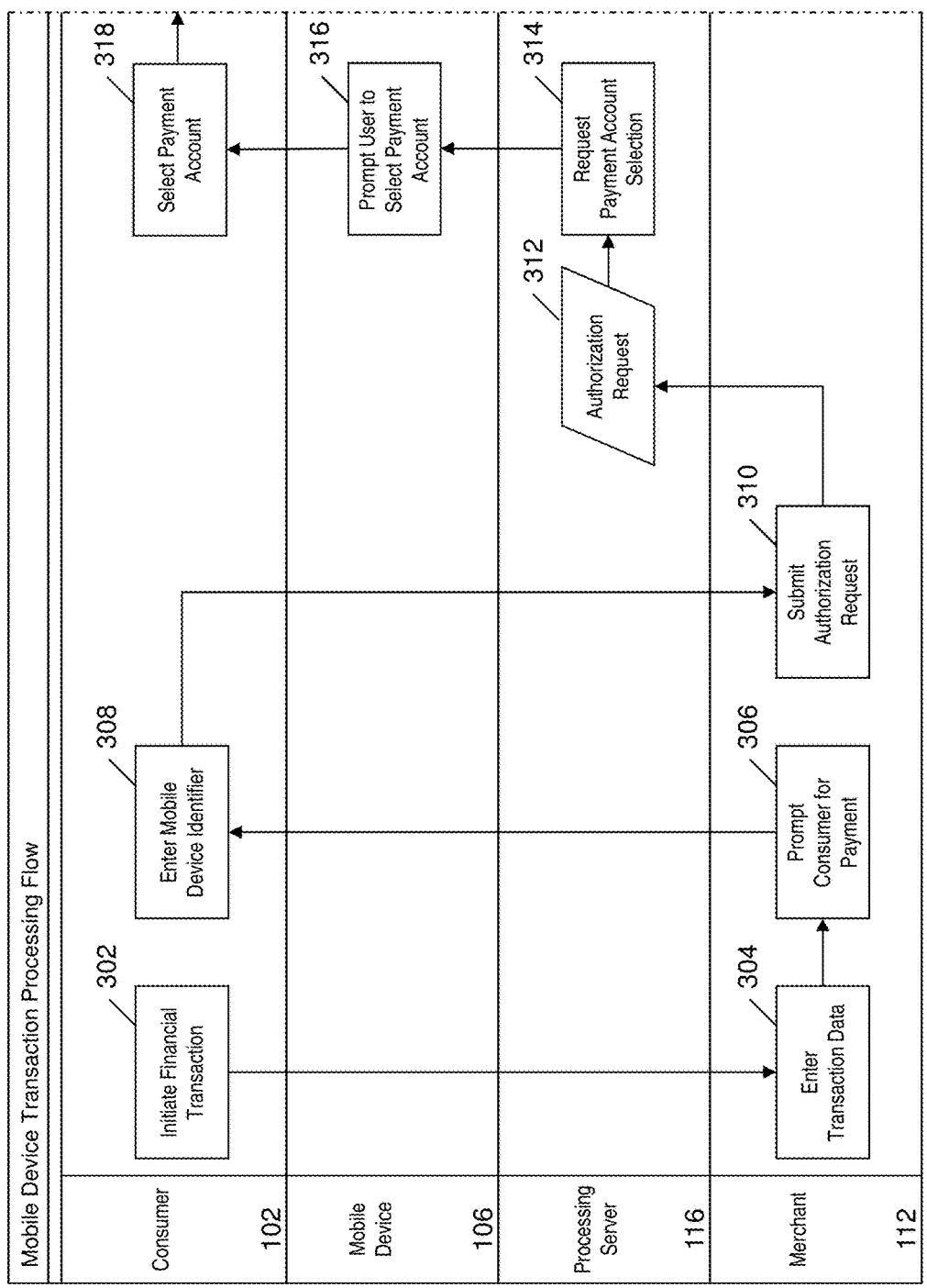
FIGS. 3A and 3B are a process flow illustrating a method for conducting a financial transaction using the mobile device and processing server of FIG. 1 in accordance with exemplary embodiments.
Figure 3B:
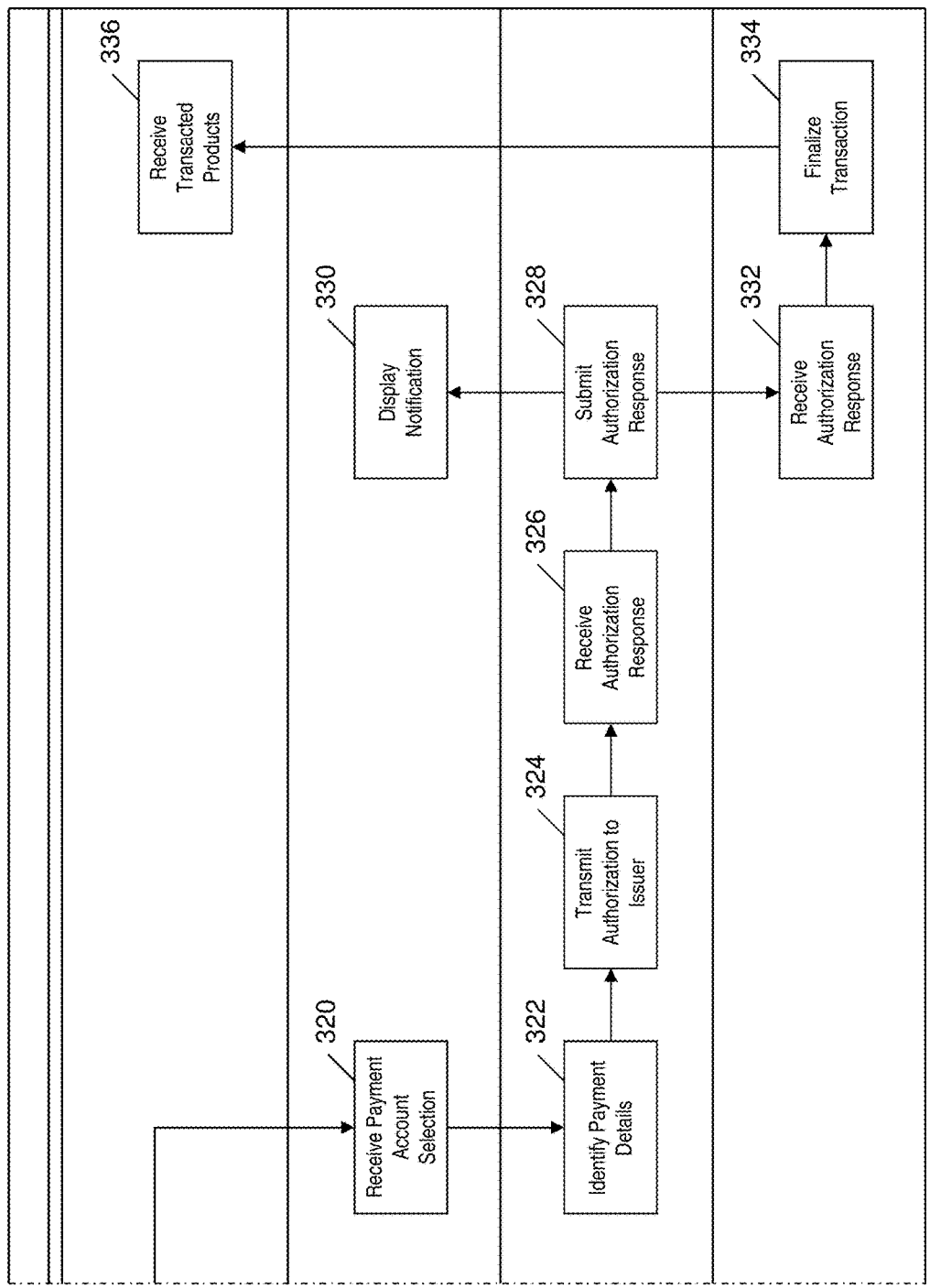

FIGS. 3A and 3B illustrate a processing flow for the processing of a financial transaction using the system 100 of FIG. 1.

In step 302, the consumer 102 may initiate a financial transaction with the merchant 112. In some embodiments, the financial transaction may be an in-person transaction. In other embodiments, the financial transaction may be an electronic transaction, such as conducted via the Internet at a website operated by or on behalf of the merchant 112. In step 304, the merchant 112 may enter transaction data into a transaction system, such as by scanning or entering product or service information into a point-of-sale system or accepting consumer input of products or services on the merchant webpage.

In step 306, the merchant 112 may prompt the consumer 102 to provide payment details for the financial transaction. In step 308, the consumer 102 may provide a mobile device identifier as a method of payment. In one embodiment, the consumer 102 may enter the mobile device identifier into a point-of-sale terminal. In another embodiment, the consumer 102 may provide (e.g., orally) the mobile device identifier to an employee of the merchant 102 for entry into the transaction system. In yet another embodiment, the mobile device identifier may be transmitted to a point-of-sale device by the mobile device 106, such as via NFC. In another embodiment, the consumer 102 may input the mobile device identifier on the merchant webpage. In an exemplary embodiment, the mobile device identifier may be a phone number. When the merchant 112 is another person (recipient), the consumer's mobile device details can be entered into the recipient's mobile device or other computing device.

In step 310, the merchant 112 (e.g., or the acquirer 114 on behalf of the merchant 112) may submit an authorization request for the financial transaction, wherein the authorization request includes transaction data and the mobile device identifier. Transaction data may include any data suitable for the processing of the financial transaction, such as a transaction amount, a transaction time and/or date, merchant details, product details, a loyalty number, an invoice number, a purchase order number, shipping details, etc.

In step 312, the processing server 116 may receive the authorization request. Then, in step 314, the processing server 116 may submit a request for a selection of payment to the mobile device 106. In some embodiments, the request for a selection of payment may include at least a portion of the transaction data, such as the transaction time and/or date, merchant details (e.g., name of the merchant 112), and the transaction amount. In step 316, the mobile device 106 may prompt (e.g., via a display unit) the consumer 102 to select a payment account based on data included in the payment selection data 108.

In step 318, the consumer 102 may select a payment account using an input unit of the mobile device 106, such as a keyboard, mouse, click wheel, touch screen, etc. In step 320, the mobile device 106 may receive the input from the consumer 102 selecting the payment account. Then, the mobile device 106 may transmit information indicating the selected payment account (e.g., an account identifier, such as the last four digits of the account number), to the processing server 116. The processing server 116 may, in step 322, receive the indication of the selected payment account and may identify, in the consumer database 118, a wallet data entry 208 including the mobile device identifier and may identify payment details associated with the payment account indicated by the consumer 102.

In some embodiments, steps 316 to 320 may alternatively include confirmation of a previously identified payment account. In such an embodiment, the consumer 102 may have previously identified a payment account to be used in payment transactions, such as with the particular merchant or payment transactions involving the mobile device 106. In these embodiments, step 316 may include prompting the consumer 102 to confirm the transaction amount or other details of the payment transaction, and steps 318 and 320 may include the consumer 102 providing confirmation. In step 322, the receiving unit 202 of the processing server 116 would receive the confirmation, and the processing unit 204 would identify the previously identified payment account in the wallet data entry 208.

In step 324, the processing server 116 may transmit an authorization request including the identified payment details to the issuer 104 associated with the payment account indicated by the consumer 102. The authorization request may include any additional transaction data suitable for the authorization of the financial transaction by the issuer 104 as will be apparent to persons having skill in the relevant art. In step 326, the processing server 116 may receive an authorization response from the issuer 104 indicating approval or denial of the financial transaction. Then, in step 328, the processing server 116 may process the financial transaction and forward the authorization response to the merchant 112 (e.g., and/or the acquirer 114). In some embodiments, the processing server 116 may also submit a notification to the mobile device 106 indicating approval or denial of the financial transaction, which, in step 330, may be displayed by the display unit of the mobile device 106.

In step 332, the merchant 112 may receive the authorization response from the processing server 116 or the acquirer 114. Then, in step 334, the merchant 112 may finalize the financial transaction. In some embodiments, step 334 can involve a merchant 112 going to an ATM to receive payment in cash, particularly when the merchant 112 is an individual receiving a P2P payment. The merchant would have to enter identifying information (e.g., an account number, mobile phone number, or transaction reference number and a PIN or other security check, the selected or designated ATM network or networks at which the payment is available, perhaps received as part of the authorization response 332) to initiate the dispensing of cash from the ATM. In some embodiments, finalizing of the financial transaction may include providing the transacted for products to the consumer 102, which may be received by the consumer 102 in step 336.

Identification of Payment Details and Processing of Financial Transactions

Figure 4:
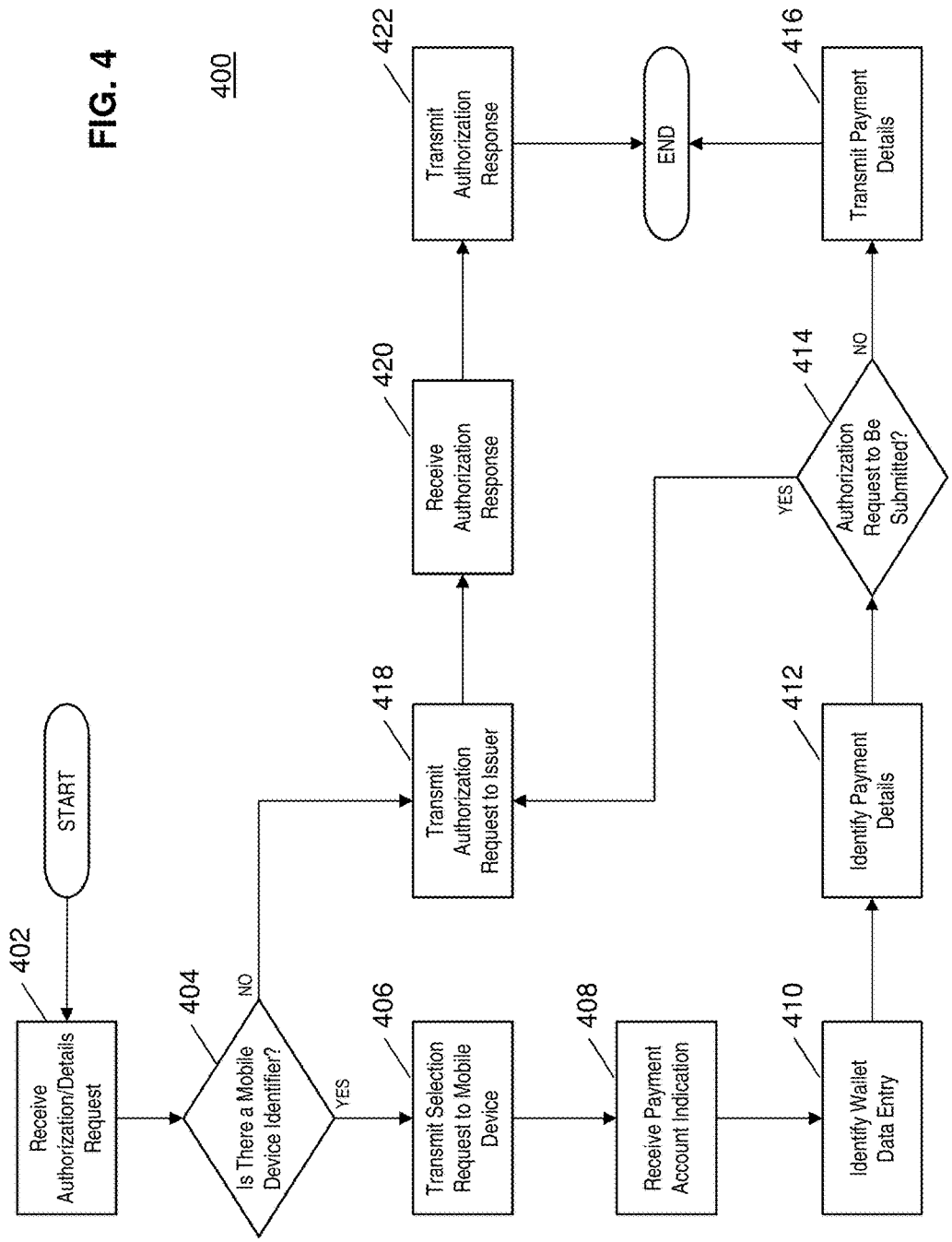
FIG. 4 is a flow chart illustrating methods for processing financial transactions and transmitting payment details in accordance with exemplary embodiments.

FIG. 4 illustrates a method 400 for the identification of payment details by the processing server 116 and the processing of financial transactions funded by a payment account indicated by the consumer 102 via the mobile device 106.

In step 402, the processing server 116 may receive (e.g., via the receiving unit 202) an authorization request and/or a payment details request. In step 404, the processing unit 206 may identify if the request includes a mobile device identifier. If the request does not include a mobile device identifier, then the method 400 may proceed to step 418 to process the financial transaction using traditional systems and methods apparent to persons having skill in the relevant art. If the processing unit 206 identifies a mobile device identifier in the request, then, in step 406, the transmitting unit 204 may transmit a payment selection request to the mobile device 106. In some instances, the payment selection request may also include transaction data.

In step 408, the receiving unit 202 may receive an indication of a payment account, or confirmation for payment using a previously identified payment account, from the mobile device 106 in response to the payment selection request. Then, in step 410, the processing unit 206 may identify a wallet data entry 208 in the consumer database 118 including the mobile device identifier. Then, in step 412, the processing unit 206 may identify payment details in the wallet data entry 208 associated with the payment account indicated as received from the mobile device 106.

In step 414, the processing unit 206 may identify if an authorization request is to be submitted (e.g., if the request received in step 402 was an authorization request). If an authorization request does not need to be submitted, such as if the request was a request for payment details (e.g., by a payment network, the acquirer 114, the merchant 112, etc.), then, in step 416, the transmitting unit 204 may transmit the identified payment details in response to the payment details request.

If, in step 414, the processing unit 206 identifies an authorization request is to be submitted, then the method 400 may proceed to step 418 to process the financial transaction using traditional methods as will be apparent to persons having skill in the relevant art. In one such method, the transmitting unit 204 may transmit an authorization request including the payment details to the issuer 104 in step 418. Then, in step 420, the receiving unit 202 may receive an authorization response from the issuer 104 indicating approval or denial of the financial transaction. In step 422, the transmitting unit 204 may transmit the authorization response to the acquirer 114 for finalization of the financial transaction.

Graphical User Interface

FIGS. 5A-5F illustrate an exemplary graphical user interface of the mobile device 106 and a computing device for the conducting of an electronic financial transaction by the consumer 102 using the mobile device 106 for the indication of a payment account used to fund the financial transaction. It will be apparent to persons having skill in the relevant art that the interface illustrated in FIGS. 5A-5F is provided as an illustration only, and additional interfaces may be suitable. Furthermore, it should be noted that the graphical user interface illustrated in FIGS. 5A-5F is with respect to an Internet transaction, and that different interfaces may be used for other types of financial transactions, such as point-of-sale transactions.

Figures 5A, 5B:
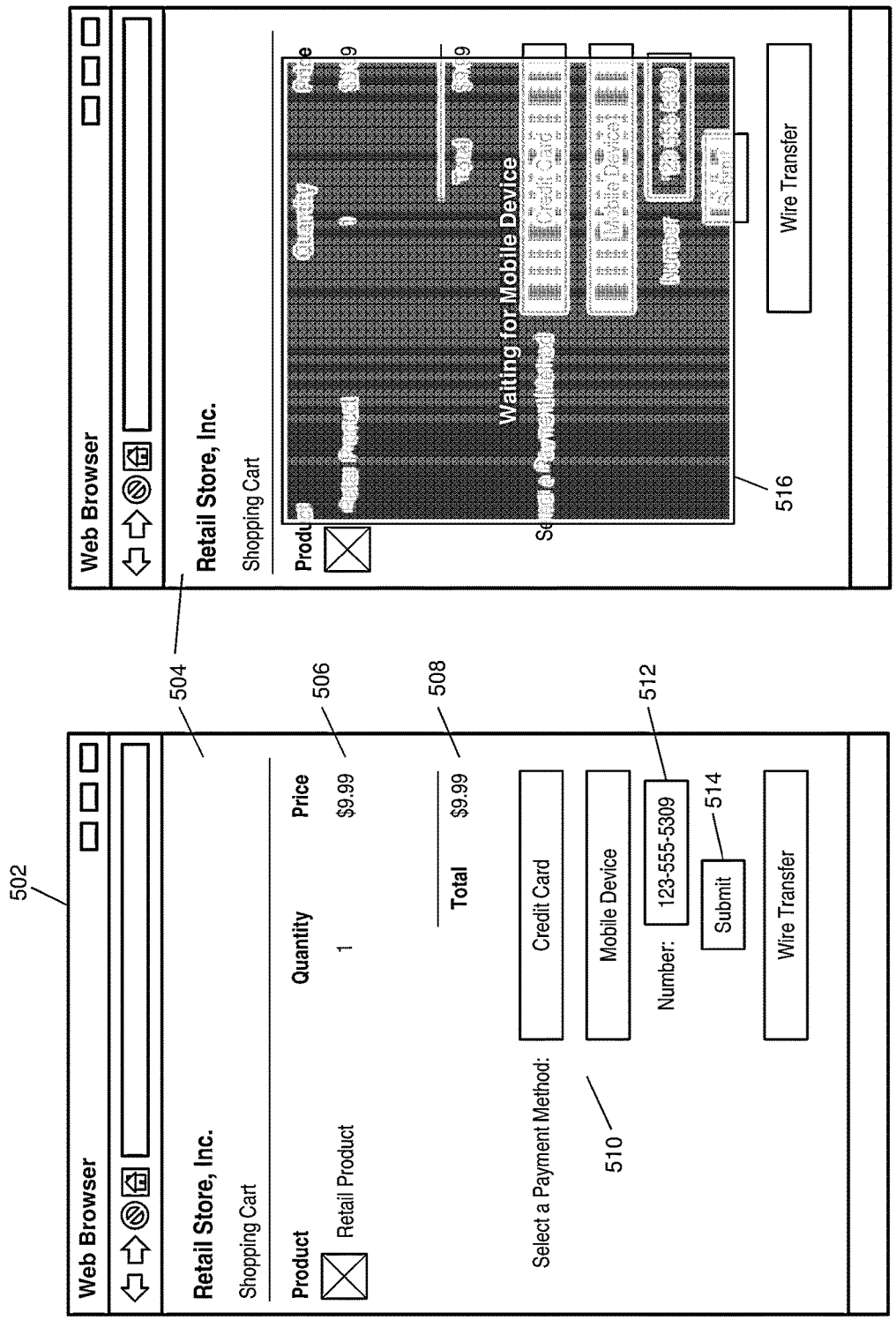

FIG. 5A illustrates a web browsing application 502, which may display a merchant webpage 504. The merchant webpage 504 may be part of a merchant website hosted by or on behalf of the merchant 112 for the purchasing of products (e.g., goods or services) by the consumer 102. The consumer 102 may navigate to the merchant website and may select one or more products for purchase. The consumer 102 may initiate the financial transaction for the selected products and may be presented with the merchant webpage 504 illustrated in FIG. 5A.

The merchant webpage 504 may include product details 506. The product details 506 may be a list of information for each product selected for purchase by the consumer 102, such as a product image, product name, product description, quantity, product cost, color, quality, shipping method, etc. The merchant webpage 504 may also include a transaction amount 508. The transaction amount 508 may be the total amount the consumer 102 must pay in order to receive the selected products.

The merchant webpage 504 may also include a plurality of payment methods 510. The payment methods 510 may include one or more methods of payment accepted by the merchant 112 for Internet transactions, such as credit card, wire transfer, gift card, virtual payment account, etc. The consumer 102 may select a button indicating payment to be made using the mobile device 106. Upon making the indication to pay using the mobile device 106, the merchant webpage 504 may display a mobile device identifier field 512 and a submit button 514.

The consumer 102 may enter the mobile device identifier corresponding to the mobile device 106 to be used for payment into the mobile device identifier field 512. As illustrated in FIG. 5A, the mobile device identifier may be a phone number associated with the mobile device 106. The consumer 102 may then interact with the submit button 514. When the consumer 102 interacts with the submit button 514, a webserver hosting the merchant webpage 504 may receive the mobile device identifier and may transmit a payment details request to the processing server 116 including the mobile device identifier and transaction data. The merchant webpage 504 may then display a waiting notification 516, illustrated in FIG. 5B, which may indicate to the consumer 102 that the merchant webpage 504 is awaiting a response from the processing server 116 prior to continuing.

Figures 5C, 5D:
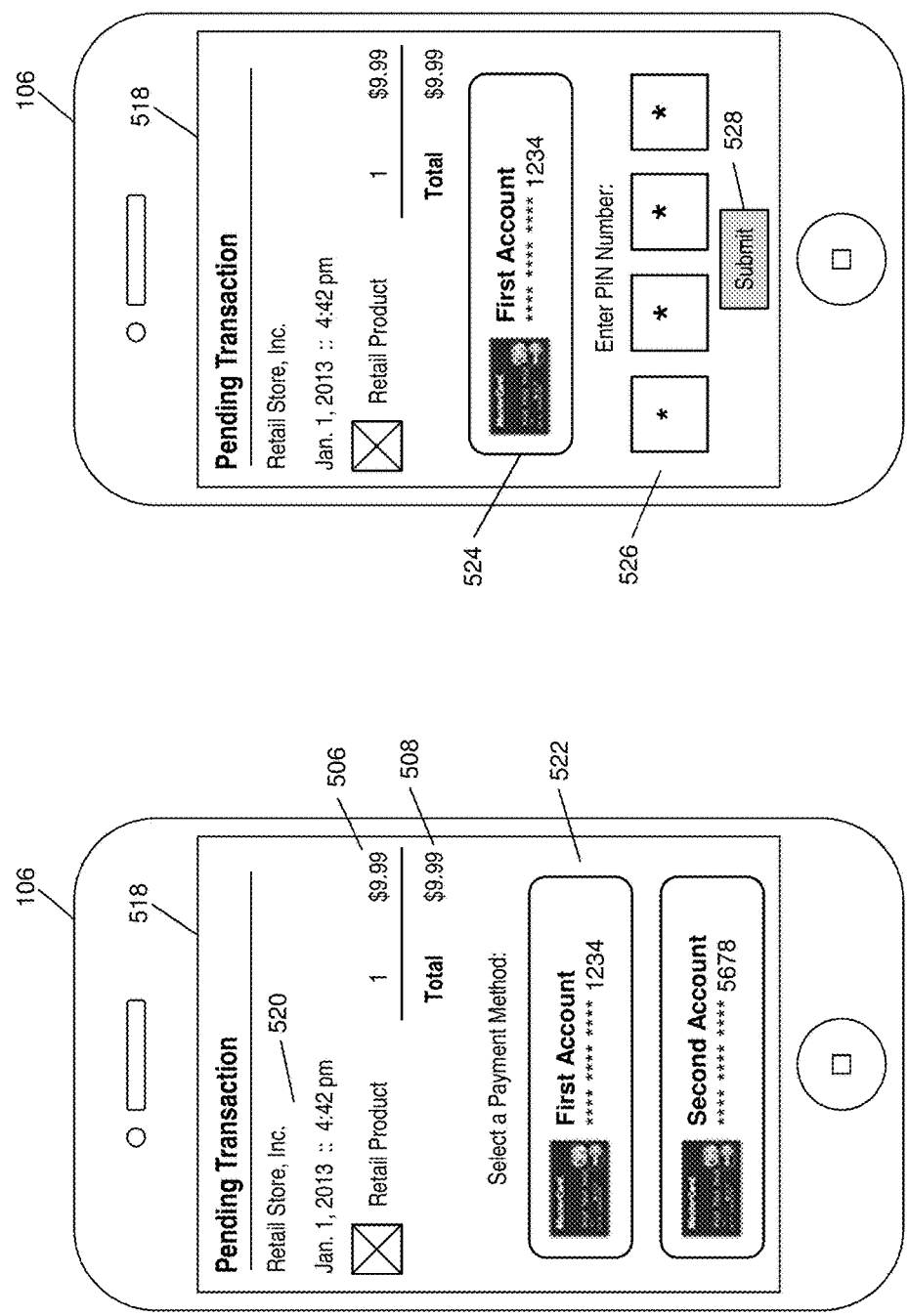

The processing server 116 may, upon receiving the mobile device identifier from the webserver, transmit a payment selection request to the mobile device 106. In some embodiments, the payment selection request may include at least a portion of the transaction data. As illustrated in FIG. 5C, the mobile device 106 may display, via a display unit 518, transaction details 520 for the financial transaction, such as a merchant name and a transaction time and/or date. The display unit 518 may also display the product details 506 and the transaction amount 508. The display unit 518 may further display at least one funding source 522, such as a plurality of payment accounts based on data included in the payment selection data 108. As illustrated in FIG. 5C, the at least one funding source 522 may include two payment card accounts.

The consumer 102 may interact with one of the at least one funding sources 522 to indicate the corresponding payment account to be used to fund the financial transaction. Then, the display unit 518 may display, as illustrated in FIG. 5D, the indicated payment account 524 and a PIN entry field 526. The consumer 102 may enter a PIN associated with the indicated payment account 524 into the PIN entry field 526 in order to authenticate the consumer 102. The consumer 102 may then interact with a submit button 528. Upon interaction with the submit button 528, the mobile device 106 may transmit information identifying the indicated payment account 524 and the entered PIN to the processing server 116. As illustrated in FIG. 5E, the display unit 518 may then display a transmission notification 530 to notify the consumer 102 that transmission of the indication of the payment account is being performed by the mobile device 106. It will be apparent to persons having skill in the relevant art that, in some instances, the graphical user interface of the mobile device 106 illustrated in FIGS. 5C-5E may be implanted via an application program configured to be executed on the mobile device 106.

The processing server 116 may, once the indication of the payment account is received, process the financial transaction using methods as disclosed herein. Once the transaction has been processed, the processing server 116 may transmit an authorization response to the merchant 112 and/or the webserver operating the merchant website. Then, as illustrated in FIG. 5F, the merchant website may present a confirmation webpage 532 to the consumer 102. The confirmation webpage 532 may display information to the consumer 102 confirming the processing of the financial transaction, such as the transaction details 520, the product details 506, the transaction amount 508, and the indicated payment account 524. Additional information suitable for display on the confirmation webpage 532 will be apparent to persons having skill in the relevant art, such as shipping information, receipt options, etc.

Exemplary Method for Processing a Financial Transaction

Figure 6:
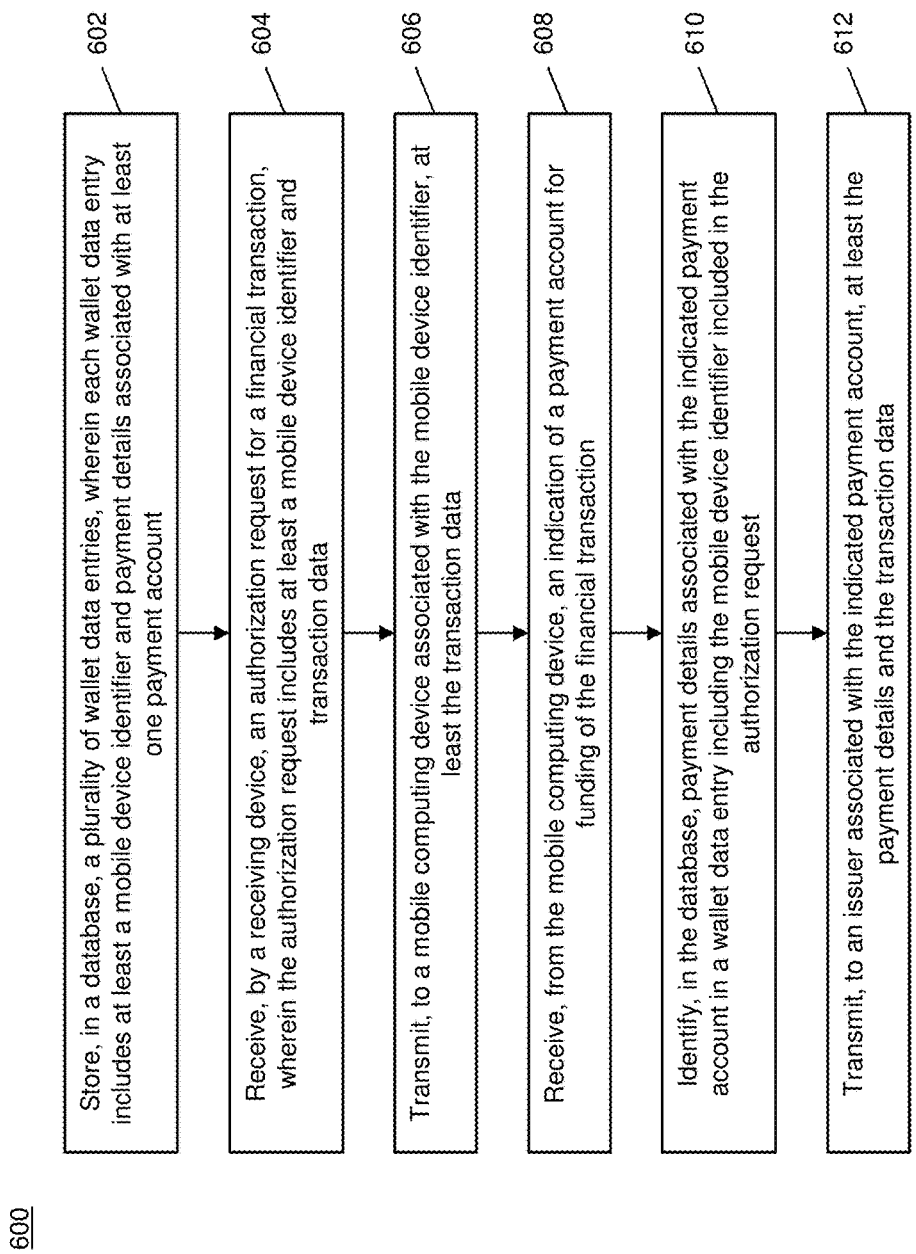
FIG. 6 is a flow chart illustrating an exemplary method for processing a financial transaction in accordance with exemplary embodiments.

FIG. 6 illustrates a method 600 for the processing of a financial transaction by the processing server 116 based on a payment account indicated by the mobile device 106.

In step 602, a plurality of wallet data entries (e.g., wallet data entries 208) may be stored in a database (e.g., the consumer database 118), wherein each wallet data entry 208 includes at least a mobile device identifier and payment details associated with at least one payment account. In one embodiment, the payment account may be a payment card account. In some embodiments, the payment details may include at least one of: a payment account number, an expiration date, and a security code.

In step 604, an authorization request for a financial transaction may be received by a receiving device (e.g., the receiving unit 202), wherein the authorization request includes at least a mobile device identifier and transaction data. In one embodiment, the transaction data may include at least one of: a transaction time and/or date, transaction amount, merchant identifier, product details, shipping details, loyalty number, purchase order number, invoice number, and transaction identifier.

In step 606, at least the transaction data may be transmitted to a mobile computing device (e.g., the mobile device 106) associated with the mobile device identifier. In one embodiment, the mobile device identifier may be a phone number associated with the mobile device 106. In another embodiment, the mobile device identifier may be a media access control (MAC) address. In step 608, an indication of a payment account for funding of the financial transaction may be received from the mobile computing device 106.

In step 610, payment details associated with the indicated payment account may be identified in a wallet data entry 208 of the consumer database 118 including the mobile device identifier included in the authorization request. In step 612, at least the payment details and the transaction data may be transmitted to an issuer (e.g., the issuer 104) associated with the indicated payment account. In one embodiment, the payment details associated with each payment account may include a mobile PIN, the receiving indication may further include a provided PIN, and step 612 may be performed only if the provided PIN corresponds to the mobile PIN included in the payment details associated with the indicated payment account.

In one embodiment, the method 600 may further include receiving, by the receiving device 202, an authorization response indicating approval of the financial transaction, and transmitting, by a transmitting device (e.g., the transmitting unit 204), the authorization response.

Exemplary Method for Identifying Payment Details

FIG. 7 illustrates a method 700 for the identification of payment details by the processing server 116 associated with a payment account indicated via the mobile device 106.

In step 702, a plurality of wallet data entries (e.g., wallet data entries 208) may be stored in a database (e.g., the consumer database 118), wherein each wallet data entry 208 includes at least a mobile device identifier and payment details associated with at least one payment account. In one embodiment, the payment account may be a payment card account. In some embodiments, the payment details may include at least one of: a payment account number, an expiration date, and a security code.

In step 704, a receiving device (e.g., the receiving unit 202) may receive a payment information request, wherein the payment information request includes a mobile device identifier. In step 706, a selection request may be transmitted to a mobile computing device (e.g., the mobile device 106) associated with the mobile device identifier. In one embodiment, the mobile device identifier may be a phone number associated with the mobile computing device 106. In another embodiment, the mobile device identifier may be a media access control (MAC) address.

In step 708, an indication of a payment account may be received, from the mobile computing device 106, in response to the transmitted selection request. In some embodiments, the indication of a payment account may include confirmation of a previously identified payment account. In step 710, a specific wallet data entry (e.g., a wallet data entry 208) may be identified, in the consumer database 118, where the specific wallet data entry 208 includes the mobile device identifier included in the payment information request.

In step 712, payment details associated with the indicated payment account may be identified in the specific wallet data entry 208. In step 714, a transmitting device (e.g., the transmitting unit 204) may transmit the identified payment details. In one embodiment, the payment details associated with the at least one payment account may each include a mobile PIN, the received indication may further include a provided PIN, and step 714 may be performed only if the provided PIN corresponds to the mobile PIN included in the payment details associated with the indicated payment account.

Computer System Architecture

FIG. 8 illustrates a computer system 800 in which embodiments of the present disclosure, or portions thereof, may be implemented as computer-readable code. For example, the mobile device 102, processing server 116, issuer 104, merchant 112, acquirer 114, and mobile network operator 110 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A, 4B, 6, and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communication infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive, the removable storage unit 818 may be a floppy disk. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art. Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

Computer program medium and computer usable medium may refer to memories, such as the main memory 808 and secondary memory 810, which may be memory semiconductors (e.g. DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4A, 4B, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Techniques consistent with the present disclosure provide, among other features, systems and methods for mapping mobile cloud accounts to payment accounts and the processing of financial transactions funded thereof. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. For instance, the mobile wallet can include the ability to receive and store coupons or other offers, particularly location-based offers based on usage preferences, sharing offers and other information on social media or via SMS or e-mail, enable money transfers, air-time top-ups, purchasing packages such as data/voice plans, utility payments, payment services for the unbanked and/or having no credit lines, as will be apparent to those skilled in the art.

What is claimed is:

1. A computer-implemented method for identifying payment details, comprising:

storing, in a database of a processing server device, a plurality of wallet data entries, wherein each wallet data entry includes at least (i) a mobile device identifier associated with a mobile computing device, (ii) payment details associated with a plurality of payment accounts and (iii) a default payment account identified from the plurality of payment accounts, said default payment account to be used to fund payment transactions, wherein said payment details associated with the plurality of payment accounts are not stored locally on the mobile computing device;

receiving, by a receiving device of the processing server, an authorization request for a financial transaction from a transaction system of a merchant involved in the financial transaction, wherein the authorization request includes at least a mobile device identifier and transaction details, and does not include payment details;

in response to receiving the authorization request from the financial system of the merchant, transmitting, by a transmitting device of the processing server device, over a communication network, via mobile network operator (MNO), to a mobile computing device associated with the mobile device identifier included in the authorization request, a confirmation request, said confirmation request including at least the transaction details associated with the financial transaction with the merchant, wherein said transmission activates an application program installed on the mobile computing device causing the transaction details to be displayed on a display of the mobile computing device and prompting user-confirmation of the financial transaction;

receiving, by the receiving device of the processing server, via the communication network, from the mobile computing device, confirmation of the financial transaction;

in response to receiving confirmation of the financial transaction from the mobile computing device, identifying, by the processing device of the processing server device, in the database of the processing server device, a specific wallet data entry including the mobile device identifier included in the authorization request received from the transaction system of the merchant;

determining, by the processing device of the processing server device, whether a default payment account is identified from the plurality of payment accounts in the specific wallet data entry;

when a default payment account is identified from the plurality of payment accounts in the specific wallet data entry, identifying, by the processing device of the processing server device, in the specific wallet data entry, payment details associated with default payment account; and transmitting, by the transmitting device of the processing server device, the identified payment details of the default payment account to a payment network for approval or denial of the payment transaction.

2. The method of claim 1, wherein the payment account is a payment card account.

3. The method of claim 1, wherein the payment details include at least one of: payment account number, expiration date, and security code.

4. The method of claim 1, wherein the mobile device identifier is a phone number associated with the associated mobile computing device.

5. The method of claim 1, wherein the mobile device identifier is a media access control (MAC) address.

6. The method of claim 1, wherein the payment details associated with at least one payment account each include a mobile personal identification number (PIN), the received confirmation further includes a provided PIN, and the identified payment details are transmitted to the payment network if the provided PIN corresponds to the mobile PIN included in the payment details associated with the identified default payment account.

7. The method of claim 1, further comprising:

receiving, by the receiving device, an authorization response from the payment network indicating approval or denial of the financial transaction; and transmitting, by the transmitting device, the authorization response to the merchant.

8. An electronic system for identifying payment details, comprising:

a processing device of a processing server device;

a database device, of a processing server device, configured to store a plurality of wallet data entries, wherein each wallet data entry includes (i) at least a mobile device identifier associated with a mobile computing device, (ii) payment details associated with a plurality of payment accounts and (iii) a default payment account identified from the plurality of payment accounts, said default payment account to be used to fund payment transactions, wherein said payment details associated with the plurality of payment accounts are not stored locally on the mobile computing device;

a receiving device, of the processing server device, configured to receive an authorization request for a financial transaction from a transaction system of a merchant involved in the financial transaction, wherein authorization request includes at least a mobile device identifier and transaction details and does not include payment details; and a transmitting device, of the processing server device, configured to transmit, over a communication network, via a mobile network operator (MNO), in response to receiving the authorization request from the transaction system of the merchant, to a mobile computing device associated with the mobile device identifier included in the authorization request, a confirmation request, said confirmation request including at least the transaction details associated with the financial transaction, wherein said transmission activates an application program installed on the mobile computing device causing the transaction details to be displayed on a display of the mobile computing device and prompting user-confirmation of the financial transaction, wherein the receiving device, of the processing server device, is further configured to receive, from the mobile computing device, confirmation of the financial transaction, the processing device, of the processing server device, is configured to, in response to receiving confirmation of the financial transaction from the mobile computing device, (i) identify, in the database device, of the processing server device, a specific wallet data entry including the mobile device identifier included in the authorization request received from the transaction system of the merchant, (ii) determine whether a default payment account is identified from the plurality of payment accounts in the specific wallet data entry, and (iii) when a default payment account is identified from the plurality of payment accounts in the specific wallet data entry, identify, in the specific wallet data entry, payment details associated with the default payment account, and the transmitting device, of the processing server device, is further configured to transmit the identified payment details of the default payment account to a financial network for approval or denial of the payment transaction.

9. The system of claim 8, wherein the payment account is a payment card account.

10. The system of claim 8, wherein the payment details include at least one of: payment account number, expiration date, and security code.

11. The system of claim 8, wherein the mobile device identifier is a phone number associated with the associated mobile computing device.

12. The system of claim 8, wherein the mobile device identifier is a media access control (MAC) address.

13. The system of claim 8, wherein the payment details associated with at least one payment account each include a mobile personal identification number (PIN), the received confirmation further includes a provided PIN, and the transmitting device is configured to transmit the identified payment details to the payment network if the provided PIN corresponds to the mobile PIN included in the payment details associated with the identified default payment account.

14. The system of claim 8, wherein the receiving device is further configured to receive an authorization response from the payment network indicating approval of denial of the financial transaction, and the transmitting device is further configured to transmit the authorization response to the merchant.

* * * * *